(12) United States Patent
Loeger et al.

(10) Patent No.: US 8,108,304 B2
(45) Date of Patent: *Jan. 31, 2012

(54) AWARD SYSTEM WITH INCREASED PAYOUT OPTIONS

(75) Inventors: Julie Anne Loeger, Lake Forest, IL (US); Vicki Ann Smith-Doyle, Chicago, IL (US)

(73) Assignee: DFS Services LLC, Riverwoods, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/632,317

(22) Filed: Dec. 7, 2009

(65) Prior Publication Data

US 2010/0082418 A1    Apr. 1, 2010

Related U.S. Application Data

(63) Continuation of application No. 10/701,098, filed on Nov. 3, 2003, now Pat. No. 7,630,935.

(51) Int. Cl.
*G06Q 40/00* (2006.01)

(52) U.S. Cl. .......................................... 705/39; 705/35

(58) Field of Classification Search .................. 705/35, 705/39, 40
See application file for complete search history.

(56) References Cited

U.S. PATENT DOCUMENTS

| 6,786,400 B1 * | 9/2004 | Bucci | 235/380 |
| 2003/0061093 A1 * | 3/2003 | Todd | 705/14 |

* cited by examiner

*Primary Examiner* — Lalita Hamilton
(74) *Attorney, Agent, or Firm* — Leydig, Voit & Mayer, Ltd.

(57) ABSTRACT

A cash rebate award system with increased payout options is presented, wherein a consumer using a financial alternative to currency is rewarded based on the purchases made by the consumer within a given time frame, and is allowed to electronically transfer the award into any number of banking or investment accounts. A standard electronic currency transfer system, such as the ABA routing number system, or the ACH routing system, can be used so as not to limit the accounts into which the consumer can transfer their award. Consumers can also choose to transfer their award to multiple accounts, or accounts belonging to others, such as family or charities. Account information can also be saved for more efficient subsequent transfers, and automated transfers can also be set up by the consumer.

19 Claims, 2 Drawing Sheets

AWARD SYSTEM WITH INCREASED PAYOUT OPTIONS

This application is a continuation of prior U.S. application Ser. No. 10/701,098 filed Nov. 3, 2003, to be issued as U.S. Pat. No. 7,630,935.

FIELD OF THE INVENTION

This invention relates generally to consumer rebate systems and more particularly to payout options for a cash value based consumer rebate or award system.

BACKGROUND

As credit cards, debit cards, and other alternatives to currency have grown in popularity, the competition among the institutions that provide these financial instruments has also increased. Today, many consumers choose a credit card, debit card, or the like, based on the financial incentive to the consumer for using such a card. For example, some credit cards offer low interest rates on balances carried from month to month, other credit cards offer miles or points in frequent flyer programs, while still others offer low fees for common financial transactions.

One popular incentive offered to consumers of credit cards is a cash or cash-equivalent award or rebate as a percentage of the consumer's purchases. Generally, such money back award systems provide as an award a percentage of the dollar amount of the total purchases made by a consumer within a given time frame, usually one year. In an effort to balance the costs of administering the system with the benefits and incentives provided to consumers, the percentage used to calculate the cash or cash-equivalents that will be provided to the consumer can vary depending on the dollar amount of the consumer's purchases. Specifically, the percentage will increase as the total dollar value of the consumer's purchases increases.

Unfortunately, many cash-equivalent award systems are inflexible. Some restrict the uses of the accumulated award in such a manner as to limit the flexibility of the entire award system to the consumer. Currently, common award usage is limited to: crediting the award back to the credit card account, mailing a check or a certificate from a partner merchant to the consumer, or donating the award to partner charities. Thus, while the consumer many nominally have been given an award, many consumers may not value the award highly because they cannot conveniently access the award or receive the award in a form that is desirable. For example, partner merchants may not be merchants at which the consumer wishes to shop. Similarly, the partner charities may not support any causes the consumer is concerned about. Furthermore, if the consumer were to attempt to receive a check, the consumer must physically deposit the check at their bank. For many consumers, therefore, the only efficient method for accessing their award is to have the award credited back to their credit card account, which may also not be a desirable option.

Award systems are designed as an enticement to consumers to use the financial institution's credit cards and, the more the consumer values the award, the more loyalty they have to the financial institution that provides the award. Therefore, financial institutions strive to provide rewards and reward disbursement options that consumers perceive as valuable.

BRIEF SUMMARY OF THE INVENTION

Embodiments of the invention provide an award system with increased payout options which provide consumers greater flexibility as well as desirable and efficient options for accessing accumulated awards, thereby increasing the overall desirability of the entire award system to the consumer.

In one embodiment, the award system with increased payout options allows consumers the flexibility to electronically direct the awards into checking or savings accounts at any financial institution. The consumer can even select to direct the awards into checking or savings accounts that are not in the consumer's name. Thus, for example, awards could be used as gifts by directing them to checking or savings accounts held by the consumer's children.

In another embodiment, the award system with increased payout options allows consumers to electronically direct the awards into an investment account, allowing the consumer to invest the award and receive even greater returns. The investment account can be a previously existing account, and can be offered by any investment institution. As before, the consumer can even select to direct the awards into investment accounts that are not in the consumer's name.

In a further embodiment, the award system with increased payout options provides simple interfaces to allow the consumer to transfer his or her awards. Such interfaces can include, but are not limited to, a dedicated web site, an automated telephone service, and personalized assistance in the form of customer service agents.

In a still further embodiment, the award system with increased payout options can store consumer preferences, allowing the consumer to quickly and efficiently transfer awards to accounts which the consumer has previously defined. The system could automatically store the most recent accounts defined by the consumer, or it could allow the consumer to select which accounts are saved, and even allow the consumer to label the accounts for easier reference.

In yet another embodiment, the award system with increased payout options can be configured by the consumer to direct accumulated awards into banking or investment accounts on a predefined schedule, or based on predefined increments. For example, the consumer can configure the award system to automatically transfer awards to another account at the end of every quarter, or whenever the consumer's awards reach a predefined level, such as $100.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
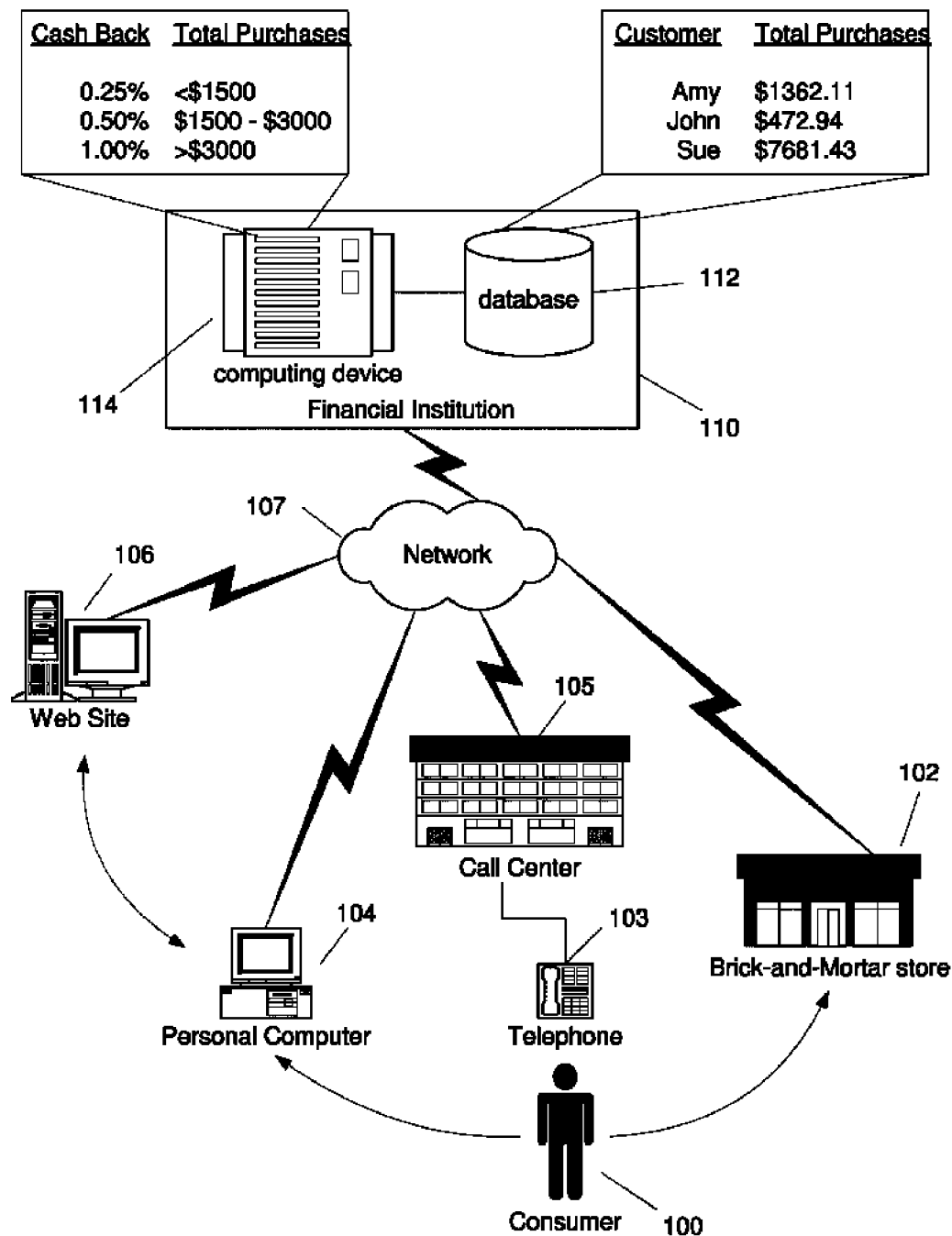
FIG. 1 is a general overview of the operation of a method and system contemplated by an embodiment of the present invention.

Well designed award programs create additional revenue and foster consumer loyalty without an unacceptable increase in costs to the institution implementing the award program. In the field of financial alternatives to currency, such as credit cards, debit cards, and the like, one popular award program is a "money back" award program (sometimes referred to as a "rebate" program) wherein the user of the financial alternative to currency receives an award in a pre-defined proportion to the value of the purchases made using the financial alternative to currency. An award system with increased payout options can solve many of the problems associated with more traditional money back award programs. Thus an award system with increased payout options can provide awards that are more valuable to the consumer, foster consumer loyalty, and increase the overall revenue from consumers using the financial alternative to currency.

For simplicity, the description that follows will be provided by reference to a specific type of financial alternative to currency known in the art as a "credit card". However, as will be clear to those skilled in the art, no aspect of the present invention is specifically limited to credit card applications. Therefore, it is intended that the following description also encompass the use of the present invention with many other forms of financial alternatives to currency, including debit cards, single-use cards, pre-paid cards, electronic currency (such as might be provided through a cellular telephone or personal digital assistant), automated collection systems (such as an electronic toll collection system), and the like.

Similarly, while the description that follows will, for simplicity, be provided by reference to a specific type of award, known in the art as a cash rebate award, it is not intended to limit the use of the present invention to award systems dealing only with cash or money per se. Thus, while embodiments of the present invention apply to the electronic transfer of currency, the invention can be applied to non-currency awards that can have defied exchange rates or stated values expressed in terms of a common currency. Such awards can include certificates, rebates, coupons, credits, discounts, refunds, and the like, and the description that follows is intended to encompass all such awards.

A financial institution providing alternatives to currency, such as credit cards, generally receives income from at least two sources: (1) the merchant, who remits to the financial institution a fee that is customarily a percentage of the purchase price of an item purchased by a consumer using the financial institution's credit card and (2) the consumer, who pays interest charges on unpaid balances that are generally, for consumer purchases, at a rate in excess of the prime rate of interest. Therefore, to increase income, a financial institution offering credit cards seeks to increase the total value of goods purchased by consumers using that institution's credit cards, which directly increases the income received from merchant fees and indirectly may increase the unpaid balance maintained by consumers, thereby increasing interest revenue. One common mechanism for increasing the total value of the goods purchased by consumers using the financial institution's credit cards is to offer an award, such as a cash rebate award, that is directly based on the total value of the goods purchased within a given time frame.

While in theory such a cash rebate system should cause consumers to increase their purchases made with the financial institution's credit cards, thereby increasing the income to the financial institution, practical experience has shown that the increases are limited. Any award program, including cash rebate award programs, must offer awards that are desirable to consumers in order to be an effective attraction. Because many cash rebate award programs limit the manner in which consumers can access their awards or do not provide convenient methods for consumers to access their awards, they may be less desirable than cash rebate awards that provide for more flexible access options.

Consequently, one mechanism for offering more desirable awards is to offer awards that are easier to access and redeem in a manner preferred by consumers. One embodiment of the present invention contemplates an award program that affords consumers the flexibility to electronically transfer their award to any number of banking or investment accounts. Consumers would not be limited to only transferring their award to accounts held in their name, but could transfer the awards as gifts, or part of an investment strategy to accounts belonging to children, grandchildren, siblings, friends, or anyone else. Similarly, consumers would not be limited to only transferring their award to accounts specifically tied to the cash rebate award program, such as dedicated investment or retirement accounts created as part of the process through which the consumer received the cash rebate award credit card. Instead, the consumer would be allowed to transfer the award in whichever manner they saw fit.

In one embodiment contemplated by the present invention, a commonly used mechanism, such as the standard American Bankers Association (ABA) routing number, could be used to provide to the consumer the broadest range of possibilities for electronically transferring their award. Similarly, a commonly used clearinghouse, such as the Automated Clearing House (ACH) could be used to provide the consumer access to the vast majority of banking institutions. The use of a common mechanism, such as the ABA routing number, and the ACH, would enable the financial institution to leverage existing networks, and provide an efficient mechanism for transferring an award to a broad range of accounts. The consumer, therefore, would be allowed to transfer their award to pre-existing accounts, providing additional convenience for the consumer. By efficiently providing the consumer access to their award, and enabling the consumer to use their award in a preferred manner, the cash rebate award system with increased payout options contemplated by an embodiment of the present invention can increase the desirability of the cash rebate awards, resulting in increased purchases, increased loyalty, and, consequently, increased revenues for the financial institution implementing the award.

Turning to FIG. 1, an implementation of the cash rebate award system with increased payout options contemplated by an embodiment of the present invention is shown with reference to an overall credit card usage environment. A consumer 100 can use a credit card to purchase goods or services at any number of locations. Exemplary locations illustrated in FIG. 1 include a brick-and-mortar store 102, a call center 105, accessed through a telephone 103, or a web site 106, accessed through a computer 104. As will be known by those skilled in the art, each of the brick-and-mortar store 102, the call center 105, and the web site 106 may offer a variety of goods and services. For example, the brick-and-mortar store 102 can be a grocery store or mass-market retailer, or it can be a doctor's office or an accountant's office. Similarly the call center 105 can, for example, be a catalog retailer or a public utility, such as a phone or cable company. Additionally, the web site 106 can, for example, be an on-line retailer, or it can be an interface to private party transactions, such as through an auction web site.

Once the consumer 100 has decided to purchase goods or services, using their credit card, from either the brick-and-mortar store 102, the call center 105, or the web site 106, an authorization can be obtained from a financial institution 110. Generally, financial institution 110 is the issuer of the credit card being used by the consumer. An authorization from the financial institution 110 allows the consumer 100 to receive goods and services from providers 102, 105, or 106 and allows the providers to be reimbursed by the financial institution 110.

Typically, an authorization can be obtained from the financial institution 110 through a network 107, which can be the Internet, a dedicated secure network, or even the phone system, such as through a voice phone call to a representative of the financial institution 110. The financial institution 110 can maintain a database, such as database 112 to record each of the transactions performed by consumers using the financial institution's credit cards. A computing device or system, such as computing device 114, can be used to monitor the transactions stored in the database 112, and can calculate various derived information, including interest charges, spending habits, and cash rebate awards, though, for simplicity, only the latter is illustrated in FIG. 1.

The consumer 100 can use their credit card at any provider of goods or services, such as providers 102, 105, and 106. The providers can communicate with the financial institution 110, such as through the network 107, to obtain authorization for the consumer's purchase and to receive reimbursement from the financial institution. The financial institution can store the transaction in a database 112 and can determine, based upon known algorithms that could be stored in computing device 114, the amount owed to the financial institution 110 by the consumer 100. The financial institution 110 can derive revenue from both the fees charged for the transaction to the providers such as providers 102, 105, and 106, and it can derive revenue from fees and interest charges paid by the consumer 100.

To increase income, the financial institution can implement a cash rebate award system with increased payout options as contemplated by one embodiment of the present invention. As will be known by those skilled in the art, cash rebate award systems are often implemented through the use of tiered calculations. Using a tiered approach, the percentage of the purchase price that is credited to the consumer as a cash rebate award can increase as the consumer's spending increases. However, the present invention is not limited in any way by the mechanisms used to determine the amount of the cash rebate award. Thus, the award can be determined based upon a fixed percentage or percentage that varies with respect to the value of the consumer's purchases. Similarly, the award can be determined by using a linear, exponential, or higher order relationship to the total purchase amount, or a tiered award structure, such as that shown in FIG. 1. The tiered award structure can have a varying number of tiers, award rates, purchase limits, and ranges of purchase limits.

FIG. 1 illustrates an exemplary computational table shown stored at computing device 114, having a tiered structure with a low tier for purchases below $1500 in total value for a year, a middle tier for purchases between $1500 and $3000 in total value for a year, and a high tier for purchases above $3000 in total value for a year. As can be seen, the exemplary computation table of FIG. 1 illustrates a standard tiered award structure, with the award being based on a percentage of the amount charged to the credit card, where the percentage increases in direct proportion to the amount charged to the credit card. As explained above, award systems having a constant percentage, or a percentage that decreases in proportion to the amount charged are equally amenable for use with the present invention.

An illustration of the calculation of a cash rebate award, using the illustrative environment shown in FIG. 1, is now described with reference to database 112, which is shown in FIG. 1 as containing three illustrative accounts. Specifically, database 112, is shown with an account for Amy having total purchases of $1362.11 for the year, an account for John having total purchases of $472.94, and an account for Sue having total purchases of $7681.43. Computing device 114 can apply the computation table shown to determine that Amy's current cash rebate award is 0.25% of $1362.11, or $3.41; John's is 0.25% of $472.94, or $1.18; and Sue's is 0.25% of $1500, 0.5% of $1500 and 1% of the remaining $4681.43, or a total of $58.06.

Figure 2:
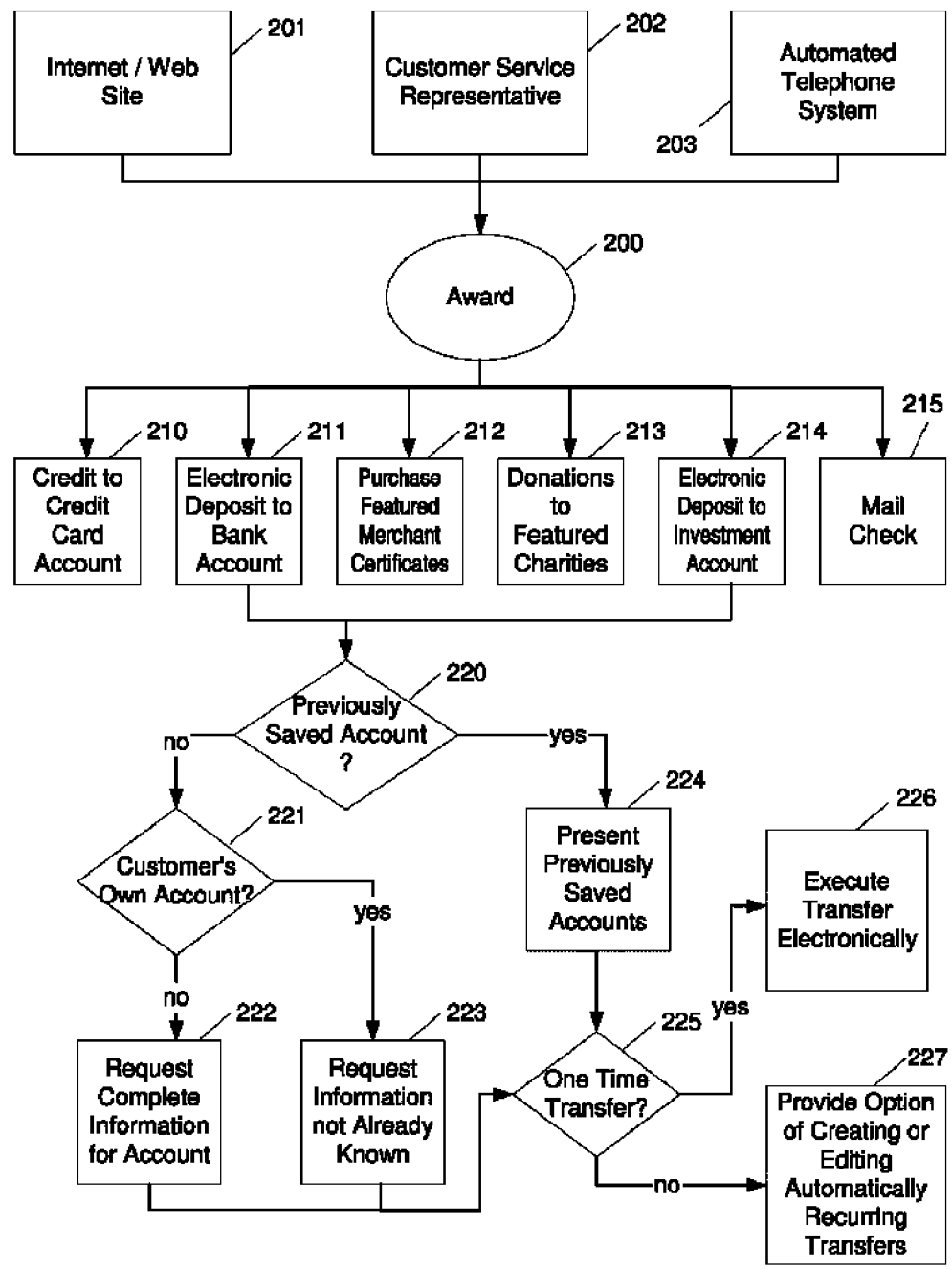
FIG. 2 is a general flow diagram illustrating some of the options contemplated by an embodiment of the present invention.

Turning to FIG. 2, the cash rebate award 200, such as, for example, Sue's $58.06, can be accessed by Sue through any number of interfaces, including an Internet or web site interface 201, a customer service representative 202, or an automated telephone system 203. As will be known to those skilled in the art, other options for accessing a cash rebate award 200 can exist, including tellers at the financial institution's branch locations, dedicated software programs, and the like. An embodiment of the present invention contemplates the use of any such interfaces, though, for simplicity, only three are shown in FIG. 2.

Once a consumer has accessed the award 200, an embodiment of the present invention contemplates providing to the consumer a number of options for receiving their award. As shown in FIG. 2, the consumer can be presented with the options of: crediting some or all of their award to their credit card account, as illustrated by option 210; electronically depositing some or all of their award to a bank account, as illustrated by option 211; redeeming some or all of their award for certificates at featured merchants, as illustrated by option 212; donating some or all of their award to featured charities, as illustrated by option 213; electronically depositing some or all of their award to an investment account, as illustrated by option 214; and requesting that some or all of their award be mailed to them as a check, as illustrated by option 215. Additional options are also contemplated by the present invention, though they are not specifically shown in FIG. 2. Such options can include purchasing airline frequent flyer miles or hotel frequent stay points, purchasing goods or services directly, and other similar options.

However, some options, such as options 210, 212, 213, and 215 may not be as desirable for consumers as options 211 and 214. For example, option 210 may simply not be a preferred method of spending the award 200. Option 215 may also not be desirable for many consumers because once the consumer receives the check, the consumer must physically deposit the check into their bank account, which can be inconvenient or difficult for consumers whose working schedules do not provide them with any time to visit their bank during banking hours. Options 212 and 213 may only be useful for those consumers who are interested in shopping at the featured merchants or donating to the featured charities. Often the featured merchants and charities can be limited, further reducing the number of consumers for whom options 212 or 213 are desirable.

Therefore, an embodiment of the present invention contemplates a cash rebate award system having increased payout options that many consumers are likely to find more convenient, more flexible and more desirable. Specifically, as shown in FIG. 2, an embodiment of the present invention contemplates allowing the consumer to electronically deposit some or all of their cash rebate award into either a bank account, as illustrated by option 211, or an investment account, as illustrated by option 214. As will be known by those skilled in the art, possible bank accounts contemplated by option 211 can include checking accounts, savings accounts, and the like.

To further enhance the convenience and desirability to consumers, an embodiment of the present invention contemplates using existing electronic routing schemes for currency, such as the ABA routing number system, or the ACH clearinghouse system, to electronically transfer the consumer's award into a wide range of accounts. Thus, the consumer will not be limited to accounts specifically tied to the consumer's credit card account, or accounts opened through the financial institution providing the award, but would be able to transfer the award into any account that can receive standardized electronic fund transfers, including bank accounts, as shown in option 211, and investment accounts, as shown in option 214. For example, a consumer could choose to have some or all of her award transferred to her checking account, which the consumer may have had long before the consumer even applied for the credit card with the cash rebate program. Similarly, the consumer could choose to transfer some or all of the award into an investment account, even if the investment account is through a different financial institution that may even be a competitor of the financial institution offering the cash rebate award program.

An embodiment of the present invention also contemplates allowing the consumer to save account information with the financial institution offering the cash rebate award, or with an institution implementing the cash rebate award on behalf of the financial institution, to provide the consumer with a more efficient transfer of the consumer's cash rebate award. As will be understood by those skilled in the art, many consumers only have a few bank accounts or investment accounts. Consequently, once they are set up by the consumer, in a manner to be described in detail below, the accounts can be stored for easier access by the consumer in the future. For example, the consumer could be allowed to store information regarding the consumer's checking account, and label the stored information as "my checking account". When the consumer accesses their award on a subsequent occasion, the consumer can be presented with the option of transferring some or all of the award to "my checking account" with no further information required from the consumer. In such a manner the consumer can more efficiently transfer awards to frequently used accounts.

Thus, turning to FIG. 2, if the consumer selects option 211 or option 214, the consumer can be presented with choice 220 to indicate whether the consumer wishes to transfer the award to a previously saved account, or whether the consumer wishes to transfer the award to a new account. As will be known by those skilled in the art, passwords or similar security measures can be implemented to ensure safety and to prevent unwanted access to saved account information. If the consumer selects previously saved accounts, those accounts can be presented to the consumer, such as by way of a list, at step 224.

An embodiment of the present invention also contemplates allowing the consumer to set up automatically recurring transfers to saved accounts. For example, the consumer could be allowed to set up an automatic transfer to direct all of the consumer's award at the end of every quarter to a previously-saved account. Alternatively, the consumer could be allowed to set up an automatic transfer to direct a predefined amount, such as $20, to a saved account every time the award accumulates to $20.

To decrease variability in award withdrawals, and to decrease the number of transactions, which can be costly, the financial institution can apply limits to the manner in which consumers access their awards. For example, a financial institution may only allow consumers to access awards in predefined increments, such as $20, or at predefined times, such as the last five days of a month, or the first 10 days of the consumer's billing cycle or once per predefined period of time, such as once per quarter, or the like. The financial institution can also vary these limits to encourage more desirable behavior by consumers by, for example, offering fewer limits for consumers with increased card usage and providing more stringent limits for consumers with decreased card usage.

Should the consumer's ability to access their award be limited in the manner described above, automatic transfers can be designed to accommodate these limits. For example, an automatic transfer at the end of every quarter could transfer the maximum amount allowed by the restrictions, such as those described above. Therefore, if the consumer was only allowed to access their award in $20 increments, and their account contained $75 at the end of a quarter, an automatic quarterly transfer could transfer $60 of the consumer's award. Similarly, if the consumer was only allowed to access their award during the first 10 days of the consumer's billing cycle, an automatic transfer designed to transfer $20 of the consumer's award as soon as the consumer had accumulated it could delay the transfer until the first day that the consumer would be allowed to access their award.

Returning to FIG. 2, after the consumer has been presented with previously saved accounts in step 224, and has selected one or more of them, the consumer can be presented with a choice for a one-time transfer or a recurring transfer at step 225. If the consumer selects a one time transfer, the electronic transfer can be executed at step 226. Alternatively, if the consumer selects recurring transfers, the consumer can be allowed to define or modify automatically recurring transfers, such as those described in detail above, at step 227.

An embodiment of the present invention also contemplates that the accounts to which the consumer can transfer their award, either on a one-time basis or a recurring basis, as described in detail above, need not belong to the consumer themselves. Thus, the consumer can transfer the award to accounts belonging to others, such as children, grandchildren, siblings, friends, or charitable organizations that are not featured charities shown in step 213. By allowing the consumer to transfer the award to others, an embodiment of the present invention allows consumers to use their awards as gifts, or as part of a savings plan, such as a college fund. The consumer can also store the account information for the accounts which do not belong to the consumer in the manner described above, to provide more efficient subsequent transfers. Additionally, the consumer can create automatically recurring transfers, as also described above, with others' accounts, which can further aid the consumer's goals, such as saving for a child's college education.

Returning to FIG. 2, if the consumer selects to set up a new account into which the award is to be transferred at step 220, the consumer can be presented with the choice of entering information about an account that is in his or her name or in the name of another at step 221. If the consumer selects to enter information regarding an account that is in his or her name, the financial institution can use the consumer's information already on file from, for example, the credit card application process, to simplify the account set up for the consumer. Thus, at step 223, the consumer can be asked to provide only the relevant information regarding the account the consumer wishes to transfer their award into which is not already known to the financial institution. Alternatively, the known information can be presented to the consumer, or a customer service representative aiding the consumer, as already entered into the appropriate fields, allowing the consumer the option of keeping the information, or editing it. However, if the consumer seeks to transfer their award to the account of another, then he or she can select to enter the information about the other's account at step 221, and at step 222, the consumer can be asked to provide all of the necessary information.

Once the consumer has entered the information needed to execute an electronic transfer of the consumer's award into the selected account, whether through step 222 or step 223, the consumer can be presented with the option of creating a recurring transfer at step 225 in the manner described in detail above.

An embodiment of the present invention additionally contemplates that the consumer can be allowed to transfer the award into multiple accounts. For example, a consumer may wish to transfer one half of the award into a checking account and another half of the award into an investment account. Alternatively, the consumer may wish to transfer their award equally among three children. In such a case, the consumer can simply define multiple accounts into which the award is to be transferred at step 222 or 223 in the manner described in detail above. The consumer can also set up automatically recurring transfers at step 225 in the manner described above. If the consumer's award transfers are restricted, such as by specific increments or at specific times, transfers to multiple accounts can accommodate this. For example, if the consumer is required to transfer awards in $20 increments, a transfer to multiple accounts can be delayed until the consumer's awards are sufficient to transfer an equal amount into each account. Alternatively, the consumer can define primary and secondary accounts, such that if the consumer's award is only sufficient for a transfer into some, but not all, of the multiple accounts, the transfer can still be executed. Of course, the consumer may have the option of not making any transfer but instead allowing the award balance to grow. Any decision by the consumer to transfer an award may be to transfer all or only a part of the available award balance at any given time. This affords the consumer increased flexibility in managing the award balance.

Returning to FIG. 2, three exemplary options for allowing the consumer to access their award 200 are presented, namely through: a web site or other Internet interface 201, a customer service representative 202, or an automated telephone system 203. The web site 201 can be a secure web site to guard against unwanted access of the consumer's award 200, and can apply additional security measures, such as email confirmations prior to executing an award transfer. Furthermore, the web site 201 can present award transfer options to the consumer through a series of web pages, in a manner known to those skilled in the art. For example, each of the steps 220 through 227 described in detail above can be presented to the consumer through an individual web page. Thus, at step 224, the consumer can be presented with a list of accounts, using labels that the consumer may have selected, and can be allowed to select one or more accounts through common interfaces, such as check boxes, radio boxes, hyperlinks, and the like. Similarly, at steps 222 and 223 the consumer can be presented with a web page comprising a series of fields indicating required and optional information, with the fields presented in step 223 already containing known information to aid the consumer in the manner described above.

Alternatively, an embodiment of the present invention contemplates that the web site interface described above, or a similar interface created by a dedicated program, but not necessarily relying on the HyperText Transfer Protocol (HTTP), can be presented to a customer service representative 202. In such a case, the representative 202 can guide the consumer through steps 220-227, described in detail above, and additional steps that may be necessary. The representative 202 can also anticipate difficulties, handle unexpected issues, and generally provide a more flexible interface for many consumers. A consumer could either call a customer service representative 202 through a dedicated phone number, or could personally visit such a representative at a physical location, such as a branch location.

An embodiment of the present invention also contemplates that an interface analogous to that described above can be presented aurally to a consumer through an automated telephone system 203. As before, an automated telephone system 203 can require passwords, Personal Identification Numbers (PINs), or similar security devices to prevent unwanted access of a consumer's award 200. Each of the options described in detail above with reference to steps 220 through 227 can be selected by the consumer through appropriate entries on the telephone keypad. Thus, for example, the consumer could select previously saved accounts by entering a number corresponding to each account. The entered number can be as simple as a single digit corresponding to the order in which the saved accounts were presented to the consumer, such as pressing the number 1 for the first account presented, or the entered number can be more complex to avoid potential errors on the part of the consumer, such as by inadvertently selecting an incorrect number on a small telephone keypad. To further simplify entry of more complex information, such as the information that may be required by steps 222 or 223, the automated telephone system 203 can employ speech recognition software, or similar technology, to aid the consumer. Alternatively, the automated telephone system 203 can simply direct the consumer to another access method, such as a customer service representative 202, if the consumer's selection requires detailed input that the consumer cannot reasonably provide using a telephone keypad.

As can be seen, a cash rebate award system with increased payout options is presented. In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

What is claimed is:

1. A physical computer readable medium having stored thereon computer executable instructions for fulfilling a request by a consumer to redeem rewards from a rewards account, the rewards account associated with a transaction account maintained by a financial institution and representing a dollar-value balance of rewards accrued to the consumer based on purchase transactions made by the consumer through the transaction account, the instructions executing the steps of:

electronically presenting to the consumer a web interface for managing the rewards account, the interface presented by a financial transactions computer system over a network and providing a plurality of redemption options for selection by the consumer, including an option to redeem at least a portion of the dollar-value balance through an electronic deposit to a bank account and at least one other option selected from the group consisting of:

an option to redeem at least a portion of the dollar-value balance through a merchant certificate;

an option to redeem at least a portion of the dollar-value balance through a credit to the transaction account; and an option to redeem at least a portion of the dollar-value balance through a charitable gift;

receiving, via the web interface, a selection by the consumer of the option to redeem at least a portion of the dollar-value balance through an electronic deposit to a bank account;

electronically presenting to the consumer, via the web interface, a field for the consumer to enter information identifying the bank account;

electronically presenting to the consumer, via the web interface, a field for the consumer to enter information specifying a selected redemption amount, the selected redemption amount being less than or equal to the dollar-value balance;

receiving, via the web interface, consumer-entered information identifying the bank account and the selected redemption amount;

debiting the rewards account by the selected redemption amount; and initiating an electronic funds transfer over a financial transactions network, using the information identifying the bank account, to the bank account in the amount of the selected redemption amount.

2. The computer readable medium of claim 1 wherein the information identifying the bank account comprises a name associated with the bank account and ABA routing information.

3. The computer readable medium of claim 1 wherein the financial transaction network routes Automated Clearing House transactions.

4. The computer readable medium of claim 1 wherein the bank account is a checking account or savings account.

5. The computer readable medium of claim 1 wherein the bank account is an investment account.

6. The computer readable medium of claim 1 wherein the bank account is maintained by a second financial institution.

7. The computer readable medium of claim 1, the instructions further executing the steps of:
electronically presenting to the consumer, via the web interface, a field for the consumer to enter information specifying a periodic time interval; and
initiating regular electronic funds transfers over the financial transactions network to the bank account in the amount of the selected redemption amount according to the specified periodic time interval.

8. The computer readable medium of claim 1, the instructions further executing the steps of:
electronically presenting to the consumer, via the web interface, a field for the consumer to enter information specifying a threshold value;
determining that the dollar-value balance of the rewards account exceeds the specified threshold value; and
initiating, in response to determining the threshold value has been exceeded, an electronic funds transfer over the financial transactions network to the bank account in the amount of the threshold value.

9. The computer readable medium of claim 1, the instructions further executing the steps of:
retrieving from a database one or more records identifying one or more previously specified bank accounts; and
electronically presenting to the consumer, via the web interface, a user-selectable option to specify one of the one or more previously specified bank accounts identified in the retrieved records as the recipient of the electronic deposit.

10. A method for enabling a consumer to redeem rewards from a rewards account, the rewards account associated with a transaction account maintained by a financial institution and representing a balance of rewards accrued to the consumer based on transactions made by the consumer through the transaction account, comprising:

electronically transmitting over a communication network, to a user station, data for providing an interface for managing the rewards account, the interface providing a plurality of redemption options from a plurality of distinct redemption categories for selection by the user, including an option to redeem at least a portion of the balance through an electronic deposit to a bank account and at least one other option;

receiving, over the network, data representing a selection by the user of the option to redeem at least a portion of the balance through an electronic deposit to a bank account;

electronically transmitting to the user station data for providing, as part of the interface, an option to identify the bank account;

electronically transmitting to the user station data for providing, as part of the interface, for the user to specify a redemption amount, the redemption amount being less than or equal to the balance;

receiving, over the network, data representing an identification of the bank account and the specified redemption amount;

determining, based on information pertaining to the transaction account, a redemption limitation for the consumer, wherein a predetermined stringency of the redemption limitation is inversely proportional to an amount of transactions incurred by the consumer in the transaction account;

determining that the electronic funds transfer to the bank account in the amount of the selected redemption amount is permissible within the redemption limitation; and when the electronic funds transfer to the bank account is permissible within the redemption limitation, initiating the electronic transfer, over a financial transactions network, to the bank account of an amount of funds corresponding to the specified redemption amount, using the data representing the identification of the bank account.

11. The method of claim 10 wherein the option to identify the bank account comprises a listing of one or more bank accounts associated with the consumer.

12. The method of claim 10 wherein the option to identify the bank account comprises a field for the consumer to enter information identifying the bank account.

13. The method of claim 12 further comprising:
electronically presenting to the consumer, via the web interface, an option to save consumer-entered information identifying the bank account.

14. The method of claim 10 wherein the redemption limitation is a maximum dollar amount that can be redeemed.

15. The method of claim 10 wherein the redemption limitation is a time interval for redemption.

16. A method for giving a gift to an intended gift recipient by redeeming rewards in a financial transactions computer system, the rewards having accrued in a rewards account associated with a transaction account maintained by a financial institution and representing a dollar-value balance of rewards accrued based on purchase transactions made through the transaction account, comprising:

providing an electronic access to a web interface configured to manage the rewards account, the interface presented by the financial transactions computer system over a network and having a plurality of redemption options from a plurality of distinct redemption categories for selection, including an option to redeem at least a portion of the dollar-value balance through an electronic deposit to a bank account;

electronically receiving a selection, through the web interface, of the option to redeem at least a portion of the dollar-value balance through an electronic deposit to a bank account;

electronically receiving a designation, through the web interface, of information identifying a bank account of the intended gift recipient;

electronically receiving a designation, through the web interface, of a selected redemption amount less than or equal to the dollar-value balance to be debited from the rewards account for transfer to the bank account of the intended gift recipient;

determining, based on information pertaining to the transaction account, a redemption limitation for the rewards account, wherein a predetermined stringency of the redemption limitation is inversely proportional to an amount of transactions incurred in the transaction account;

determining that an electronic funds transfer to the bank account of the intended gift recipient in the amount of the selected redemption amount is permissible within the redemption limitation; and when the electronic funds transfer to the bank account of the intended gift recipient is permissible within the redemption limitation initiating the electronic funds transfer.

17. The method of claim 16 wherein the intended gift recipient is a child of the consumer.

18. The method of claim 16 wherein the bank account of the intended gift recipient is a checking account or savings account.

19. The method of claim 16 wherein the bank account of the intended gift recipient is an investment account.

* * * * *